(12) United States Patent
Downie et al.

(10) Patent No.: US 6,213,511 B1
(45) Date of Patent: Apr. 10, 2001

(54) SEAT BELT PRETENSIONER

(76) Inventors: Andrew John Downie, 44 St. Edmonds Park, Carlisle Cumbria CA2 1AX; David Smith, 29 Green Croft, Brampton, Cumbria CA8 1AX; Mike Hill, 43 Townfoot Park, Brampton, Cumbria CA8 1RZ; David Burke, 34 Rosebery Road, Carlisle, Cumbria CA3 9HU, all of (GB)

(*) Notice: Subject to any disclaimer, the term of this patent is extended or adjusted under 35 U.S.C. 154(b) by 0 days.

(21) Appl. No.: 09/101,656
(22) PCT Filed: Jan. 17, 1997
(86) PCT No.: PCT/GB97/00157
  § 371 Date: Mar. 15, 1999
  § 102(e) Date: Mar. 15, 1999
(87) PCT Pub. No.: WO97/26161
  PCT Pub. Date: Jul. 24, 1997

(30) Foreign Application Priority Data

Jan. 19, 1996 (GB) .................................... 9601075

(51) Int. Cl.$^7$ .................................................. B60R 22/46
(52) U.S. Cl. ........................................... 280/806; 297/480
(58) Field of Search ............................ 280/806, 807; 297/474, 476, 477, 480

(56) References Cited

U.S. PATENT DOCUMENTS

| | | | |
|---|---|---|---|
| 3,999,780 | * 12/1976 | Matsuoka et al. | 297/470 |
| 5,056,739 | * 10/1991 | LeVay | 244/122 AC |
| 5,163,708 | * 11/1992 | Kotama | 280/806 |
| 5,282,672 | * 2/1994 | Borlinghaus | 297/468 |
| 5,294,150 | * 3/1994 | Steffens, Jr. | 280/801.2 |
| 5,772,246 | * 6/1998 | Gordon | 280/806 |

* cited by examiner

*Primary Examiner*—J. J. Swann
*Assistant Examiner*—David R. Dunn
(74) *Attorney, Agent, or Firm*—Markell Seitzman

(57) ABSTRACT

A pretensioner for a vehicle safety restraint, for rapidly reducing slack in a safety restraint belt in the event of a crash situation, the pretensioner comprising a cable (1) connected at one end to a piston (3) at its other end to a belt rewinding mechanism, the piston (3) being slidably moveable in a cylinder (4) under action of pressure from a gas generator (15) sensitive to a crash indicator, wherein means (5) are provided for controlling the rate of acceleration of the cable (1) in the pretensioning direction, in dependence upon the condition of tension in the safety restraint belt which is to be pretensioned. This can be effected by blocking holes in a dividing plate or by using a continuously variable throttle arrangement such as a profiled throttle pin or a hollow space in the piston with a restrictable opening. The invention allows pretensioning forces to be automatically tailored to the requirements at the time of the crash and as a result provides more comfort to the vehicle occupant while maintaining the required strict safety standards.

5 Claims, 3 Drawing Sheets

SEAT BELT PRETENSIONER

DESCRIPTION

The present invention relates to a pretensioner and particular to a pyrotechnic pretensioner in which a seat belt is tightened when an impending crash condition is detected so as to ensure that there is no slack in the belt system. In a pyrotechnic pretensioner this slack is eliminated by pulling back a buckle anchorage of the belt system or rapidly rewinding a seat belt retractor by means of the force generated by an explosive charge.

However, known pretensioning arrangements do not distinguish between a situation where there is slack present in the belt system and one in which there is no slack present. With no slack in the system, a much larger pretensioning force is required and thus a much larger pyrotechnic charge. A problem arises in using a large pyrotechnic charge since when there is slack in the system this results in a high pretensioning acceleration which in itself can have an adverse effect on the vehicle occupant and may cause injury.

It is an object of the present invention to provide a pretensioner arrangement which overcomes the disadvantages of prior known systems and in particular can accommodate both slack and no slack conditions in the belt system.

According to the present invention there is provided a pretensioner for a vehicle safety restraint, for rapidly reducing slack in a safety restraint belt in the event of a crash situation, the pretensioner comprising a cable connected at one end to a piston and at its other end to a belt rewinding mechanism, the piston being slidably moveable in a cylinder under action of pressure from a gas generator sensitive to a crash indicator, wherein means are provided for controlling the rate of acceleration of the cable in the pretensioning direction, in dependence upon the condition of tension in the safety restraint belt which is to be pretensioned.

Preferably the pressure is controlled by varying the volume available to the gas. Alternatively, the size of a vent between parts of the volume may be controlled to control the pressure.

For a better understanding of the present invention and to show how the same may be carried into effect, reference will now be made to the accompanying drawings in which.

Figure 1A:
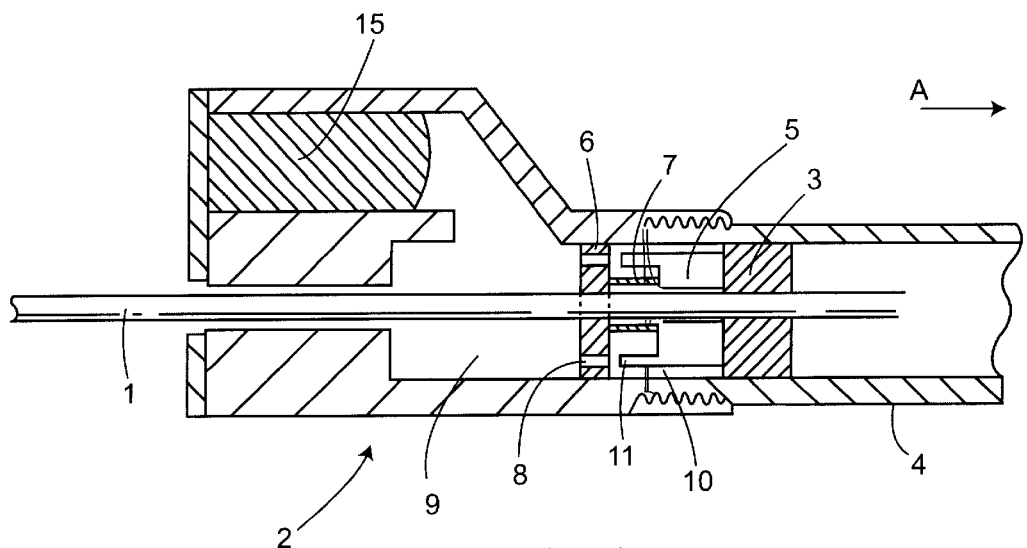
FIG. 1a is a cross-sectional view of a variable volume pretensioner according to a first embodiment of the present invention.

In FIG. 1a a pretensioning cable 1 passes through a pretensioner head 2 into a pretensioning cylinder 4 where it is connected to a piston 3. A gas generator 15 is fixed in the pretensioner head 2. The piston 3 has an extension component 5 which is separated from a sealing component 6 by a crush ring 7. The sealing component 6 has holes 8 circumferentially spaced on a radius and is slidable on the cable 1.

When the gas generator 15 is activated, in the event of a crash situation being detected, it releases gas into a first space 9 and, via subsequently the holes 8, into a second space 10. Shown in FIG. 1a is the condition when there is some slack in the seat belt such that relatively little tension is felt on the cable 1. In this condition therefore a relatively large volume comprised of space 9 plus space 10 is available to the gas issuing from gas generator 15. This large volume means that a relatively low pressure is exerted by the gas on piston 5 and thus a relatively low rate of acceleration of the piston 3 in the direction of arrow A results. Thus the pretensioning operation when there is slack present in the system takes place at a relatively low acceleration affording more comfort but nonetheless adequate safety to the vehicle occupant.

However, when there is no slack in the system, then cable 1 is under tension and offers resistance to movement of piston 3 under the influence of the gas pressure. Thus the gas pressure acting on sealing component 6 is higher than it is under slack conditions and the crush ring 7 will be squeezed between the sealing component 6 and the piston extension 5, and will thus be shortened. When this happens, projections 11 on piston extension 5 are forced against corresponding aligned sealing ring holes 8 and will seal them. Thus, the chamber 10 is sealed from chamber 9 and is no longer available to the expanding gas which is then restricted to volume 9. The smaller volume thus presented results in a greater gas pressure applied to the surface of sealing component 6 and thus, via crush disc 7 and piston extension 5, to piston 3. Thus, in conditions of no slack, a greater force is applied to the piston 3 and tends to move the pretensioning cable 1 with greater initial acceleration in the direction A.

In the case where the gas generator 15 is a pyrotechnic device, the reduced volume will also increase the burn rate and thus further increase the pressure.

Figure 1B:
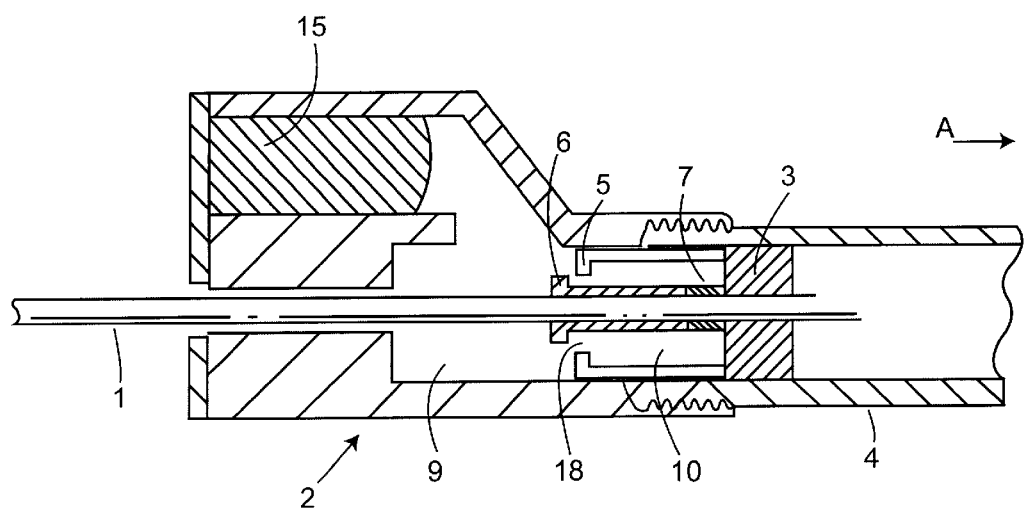
FIG. 1b is a cross-sectional view of a variable volume pretensioner according to a second embodiment of the present invention.

FIG. 1b shows an alternative embodiment where a variable volume is present within the pretensioner depending upon whether there is or is not slack in the seat belt system.

Pretensioning cable 1 passes through pretensioner head 2 and through pretensioning cylinder 4 where it is attached to piston 3. Like parts are denoted by like reference numerals. In this embodiment the sealing component 6 is a more elongate member and is again slidably mounted on cable 1. Instead of holes 8, communication between spaces 9 and 10 is provided by a gap 18 between an outwardly radial extension of component 6 and an inwardly radial extension of piston extension 5.

This embodiment works in a similar way to that of FIG. 1a. Under slack conditions the cable 1 offers little resistance and the gap 18 is maintained so that gas from gas generator 15 can occupy the combined volume of spaces 9 and 10. This larger volume results in a relatively lower pressure on the piston and a relatively lower acceleration in the direction A. Under conditions of no slack, the cable 1 and thus the piston 3 offer a larger resistance, causing crush disc 7 to be shortened and thus closing the gap 18. Thus the expanding gas from gas generator 15 has only the volume of space 9 to occupy causing it to present a higher pressure to the piston 3 resulting in a relatively higher acceleration in the direction A.

Figure 2A:
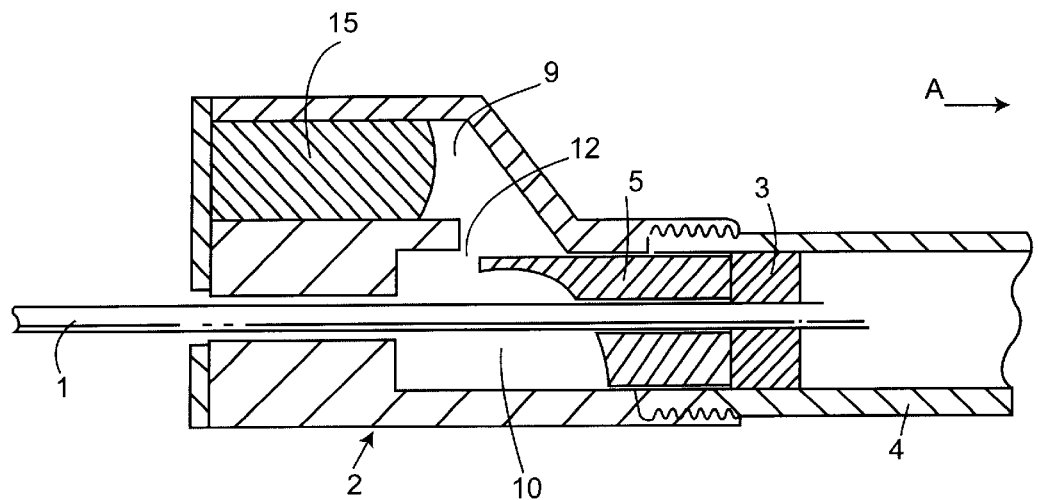
FIG. 2a is a cross-sectional view through part of a pyrotechnic pretensioner according to a third embodiment of the invention, using a variable sized vent.
Figure 2B:
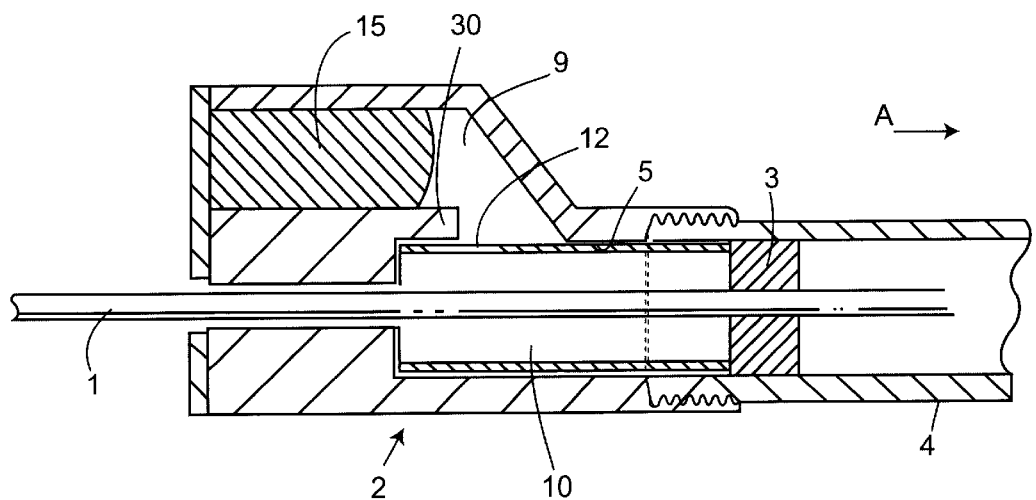
FIG. 2b is a cross-sectional view through part of a pyrotechnic pretensioner according to a fourth embodiment of the invention, using a variable sized vent.

FIGS. 2a and 2b show embodiments of the present invention using a variable vent size. Where appropriate like components are denoted by like reference numerals to FIGS. 1a and 1b.

In particular cable 1 passes through pretensioner head 2 into pretensioner cylinder 4 where it is attached to piston 3. Piston 3 has a choke extension part 5 extending into volume space 10 in such a way as to create a venting gap 12 between parts 10 and 9.

When slack is present in the seat belt system, the cable and thus the piston offer little resistance to movement under pressure of the gas from gas generator 15. Thus, the piston 3 and the choke 5 are driven along the cylinder 4 and the size of vent 12 is increased. As the venting gap 12 increases in size, the burn rate and consequently the pressure in space 9 decrease resulting in relatively lower acceleration in the direction A and increased comfort for the occupant.

When there is no slack in the system then the cable 1 and the piston 3 do offer resistance to movement and the venting gap 12 remains small. A small venting gap 12 results in relatively increased pressure, increased burn rate and a higher force on the piston resulting in relatively higher acceleration in direction A.

FIG. 2b shows another embodiment of the invention utilising a variable vent size. Where appropriate, like reference numerals are used to those in FIG. 2a. Here the piston 3 is attached for movement to a cylinder 5 with an aperture 12. The distance of the cylinder 5 from the front part 30 of pretensioner head 2 determines the size of opening of aperture 12 and thus the access of gas from the gas generator 15 into the space 10 inside cylinder 5.

Figure 3:
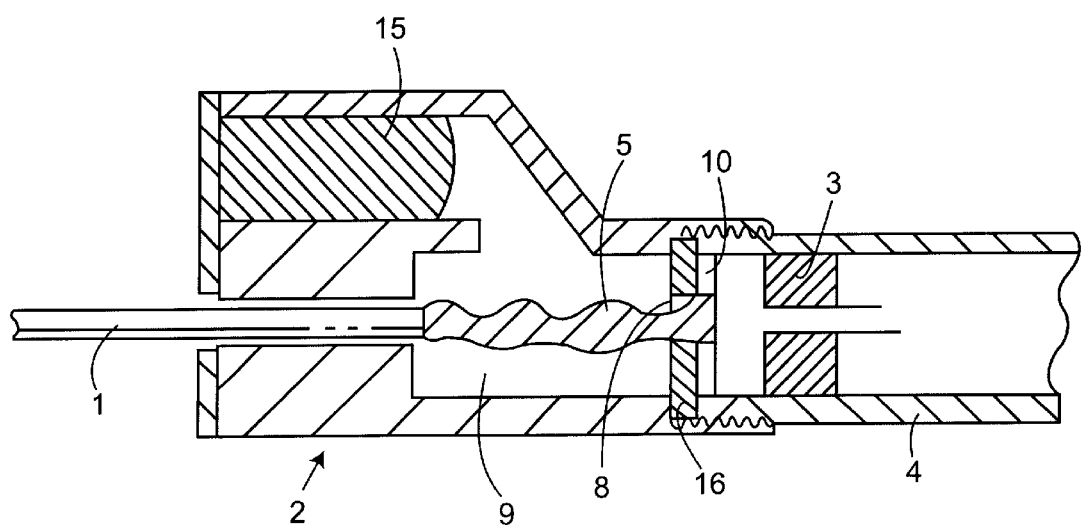
FIG. 3 is a cross-sectional view through a pyrotechnic pretensioner according to a fifth embodiment of the present invention.

FIG. 3 shows a further embodiment of the present invention in which a profiled piston is used to vary the vent size and thus vary the pressure.

Cable 1 passes through pretensioner head 2 and is connected to piston 3 in pretensioner cylinder 4 via a profiled throttle pin 5. Throttle pin 5 passes through aperture 8 in a fixed sealing disk 16 at the forward end of cylinder 4.

This throttle pin 5 has an undulating wave-like profile in cross-section so as to present a variable cross-section to the aperture 8 and thus to variably block the pneumatic connection between space 9 and space 10. By appropriate profiling of the throttle pin 5, the rate of acceleration of the piston 3 and cable 1 under specified conditions, can be programmed to meet desired requirements.

What is claimed is:

1. A pretensioner for a vehicle safety restraint, for rapidly reducing slack in a safety restraint belt in the event of a crash situation, the pretensioner comprising a cable connected at one end to a piston (3) and at its other end to a belt mechanism, the piston (3) being slidably moveable in a cylinder (4) under action of pressure from a gas generator (15) sensitive to a crash indicator, wherein means are provided for controlling the rate of acceleration of the cable in the pretensioning direction in dependence upon the condition of tension in the safety restraint belt which is to be pretensioned, wherein the acceleration controlling means comprises means controlling the pressure applied to the piston (3) by gas generated by the gas generator (15) on operation of the pretensioner, and the pressure controlling means comprises means for varying the volume which is available to the gas between the gas generator (15) and the piston (3), wherein the volume available to the gas comprises first and second spaces (9, 10) variably pneumatically interconnectable via a vent hole (8), the pressure controlling means comprises means for varying the size of the vent hole (8), the first space being connected to the gas generator (15) and the second space being adjacent an actuating face of the piston (3); comprising a dividing plate (6, 16) dividing the two spaces (9, 10), and being connected to and movable with the piston (3) by means of one or more crushable struts (7), the dividing plate (6, 16) being slidable in the cylinder (4) relative to the cable (1), and having at least one vent hole (8) formed in it to connect the two spaces (9, 10), the piston (3) having at least one vent hole sealing surface mounted on an extension of the piston (3), facing respective vent holes and separated therefrom, the crushable struts (7) being deformable when a predetermined tension is present in the cable, so as to move the sealing face into blocking engagement with respective vent holes (8).

2. A pretensioner according to claim 1 wherein the pressure controlling means comprises means for closing the vent hole (8).

3. A pretensioner for a vehicle safety restraint, for rapidly reducing slack in a safety restraint belt in the event of a crash situation, the pretensioner comprising a cable connected at one end to a piston (3) and at its other end to a belt mechanism, the piston (3) being slidably moveable in a cylinder (4) under action of pressure from a gas generator (15) sensitive to a crash indicator, wherein means are provided for controlling the rate of acceleration of the cable in the pretensioning direction in dependence upon the condition of tension in the safety restraint belt which is to be pretensioned, wherein the acceleration controlling means comprises means controlling the pressure applied to the piston (3) by gas generated by the gas generator (15) on operation of the pretensioner, and the pressure controlling means comprises means for varying the volume which is available to the gas between the gas generator (15) and the piston (3), wherein the volume available to the gas comprises first and second spaces (9, 10) variably pneumatically interconnectable via a vent hole (8), the pressure controlling means comprises means for varying the size of the vent hole (8), the first space being connected to the gas generator (15) and the second space being adjacent an actuating face of the piston (3); wherein the pressure controlling means comprises means for varying the size of the vent hole opening (8) over a continuous range.

4. A pretensioner according to claim 3 wherein the second space (10, 9) comprises a hollow member attached to the piston (3) for movement therewith and having the vent hole (8) formed in the hollow member communicating with the first chamber (9, 10), there further being a blocking arm fixedly positioned relative to the hollow member for variable blocking of the vent hole.

5. A pretensioner for a vehicle safety restraint, for rapidly reducing slack in a safety restraint belt in the event of a crash situation, the pretensioner comprising a cable connected at one end to a piston (3) and at its other end to a belt mechanism, the piston (3) being slidably moveable in a cylinder (4) under action of pressure from a gas generator (15) sensitive to a crash indicator, wherein means are provided for controlling the rate of acceleration of the cable in the pretensioning direction in dependence upon the condition of tension in the safety restraint belt which is to be pretensioned, wherein the acceleration controlling means comprises means controlling the pressure applied to the piston (3) by gas generated by the gas generator (15) on operation of the pretensioner, and the pressure controlling means comprises means for varying the volume which is available to the gas between the gas generator (15) and the piston (3), wherein the volume available to the gas comprises first and second spaces (9, 10) variably pneumatically interconnectable via a vent hole (8), the pressure controlling means comprises means for varying the size of the vent hole (8), the first space being connected to the gas generator (15) and the second space being adjacent an actuating face of the piston (3); wherein the pressure controlling means comprises a profiled throttle pin (5) connected to and movable with the piston (4), and wherein there is a dividing plate (16) dividing the two spaces, which plate has a hole (8) in it which is blockable by a cross-section of the profiled throttle pin (5).

* * * * *